April 18, 1961 H. P. JACOBSON ET AL 2,980,328

COUNTER MECHANISM

Filed Oct. 3, 1956 2 Sheets-Sheet 1

INVENTORS
HERBERT P. JACOBSON
WINSTON F. WILLIAMS
BY
Moody & Habecker
ATTORNEYS

April 18, 1961 H. P. JACOBSON ET AL 2,980,328

COUNTER MECHANISM

Filed Oct. 3, 1956 2 Sheets-Sheet 2

INVENTOR.
HERBERT P. JACOBSON
WINSTON F. WILLIAMS
BY
Mordy & Habecker
ATTORNEYS

United States Patent Office 2,980,328
Patented Apr. 18, 1961

2,980,328

COUNTER MECHANISM

Herbert P. Jacobson, Quito, Ecuador, and Winston F. Williams, Cedar Rapids, Iowa, assignors to Collins Radio Company, Cedar Rapids, Iowa, a corporation of Iowa Filed Oct. 3, 1956, Ser. No. 613,788

1 Claim. (Cl. 235—136)

This invention relates to counter mechanisms and more particularly to means for ensuring proper registration of the indicia.

In prior art systems of this nature a serious problem arose when two related input motions were made to separate portions of the counter mechanism. A specific application of the device, shown here, is to the dial of a radio receiver or transmitter. In these equipments coarse and fine tuning motions are usually provided with a dial system for each motion. These dial mechanisms are counters in that the inputs of the two tuning motions are registered on two separate dial systems having a geared, counting relation. Because of the geared relation of the fine and coarse motions, use of the fine tuning motion introduces a motion in the coarse tuning dial to move it to the next digit before the fine tuning had reached the last fine digit, e.g. 1.90 would appear 2.90.

Accordingly, it is an object of the invention to provide a correction to the prior art counter systems which compensates for undesired movement of the coarse motion dial because of input to the fine motion dial.

It is a further object of this invention to provide a counter which keeps its indicia in registration with the indicator line despite multiple input motions.

It is a feature of the invention that a correction is fed from the fine motion counter to the mechanism of the coarse motion counter in such a way as to prevent misregistration of the coarse motion indicia.

Further objects, features, and advantages of the invention will become apparent from the following description and claims when read in conjunction with the drawings, in which:

Figure 1:
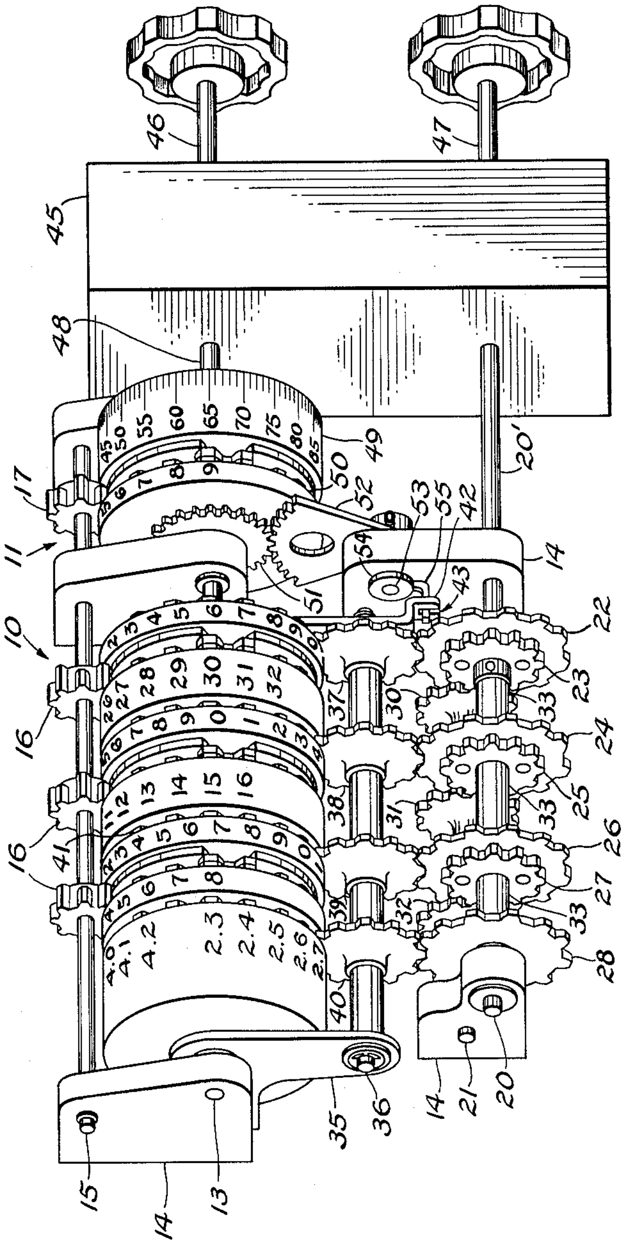
Figure 1 shows a view of the complete counter mechanism.

In Figure 1 a series of a coarse frequency dials 10 and a pair of fine frequency dials 11 are coaxial and adjacent one another. The coarse frequeny dials are free running on a dial shaft 13 which is fixed to a frame 14, shown incomplete in this illustration to avoid needless detail. Also mounted in frame 14 is a counter transfer shaft 15 which carries freely running transfer pinions 16. These transfer pinions engage both continuous gearing and interrupted tooth gearing on the coarse frequency dials 10 to provide a counting action between related dials. Thus, dials so joined will have the relation of units and decades. Also on transfer shaft 15 is a pinion 17 which, similar to pinion 16, transfers carry-over information from one of the fine motion dials to another performing a similar counting operation. Use of the device in a radio receiver would establish dials 11 as fine frequency dials and dials 10 as the coarse frequency dials. The input motion on the coarse frequency dial may be continuous but is usually detented at the input motion itself while the fine frequency dials are driven by a continuous input motion. Another use of our invention is described in our copending application, Serial Number 613,348 filed October 1, 1956, now Patent No. 2,886,707, for Interpolator Device.

Also mounted in frame 14 is a pair of input bearing shafts 20 and 21. Shaft 20 is mounted in bearings so as to turn freely. Shaft 21 is mounted fixedly permitting the gears running thereon to turn freely. Input bearing shaft 20 extends to the right in the illustration at 20′ to be the input motion for the coarse frequency dials. The gears on the input motion shaft are, in order, 22, 23, 24, 25, 26, 27, and 28. Gears 22 and 23 are pinned together and to the input motion.

The counter shaft 21 carries a series of spool gears meshed with the gears on the input shaft 20. The gears on the counter shaft provide a step-down transfer function between the stages of gears on the input shaft. Of the spool gears running on shaft 21 only the lead gears 30 and 31 are visible. The spool gear starting with 30 meshes with 23 and 24. Spool gears starting with 31 and 32 couple 25 to 26 and 27 to 28, respectively. This provides the gear-down necessary to relate the coarse frequency dials to the input motion. On input shaft 20, gears 24 and 25 and gears 26 and 27 are pinned together as pairs and also are free to rotate on the input shaft. Spacers 33 keep the gears on the input shaft properly positioned for meshing with the rest of the counting mechanism.

The description thus far describes the counters used prior to the invention. Pursuant to the invention, a correction bracket 35 is free to rotate on dial shaft 13 and carries on it a correction shaft 36. This shaft provides an axle for idlers 37, 38, 39, and 40 meshing with gears 22, 24, 26, and 28, respectively. These idlers transfer the motion of the gears on the input shaft to the gearing, e.g. 41, related to the counters in the dial system. It is to be observed that motion of the correction shaft with the input motion held fixed will move the coarse motion dials. One end of the correction bracket is extended at 42 and provided with a slot 43 which is used as a coupling slot. A slot is necessary as will be observed later in the description of the operation since the motion imparted to the bracket through the slot is not at a fixed radius such as to permit the use of a round hole.

In application, the dial mechanism or counter has a gear box 45 provided with a fine motion shaft 46 and a coarse motion shaft 47. Both of these are shown having knobs for digital motion but may be positioned by automatic or other types of positioning means. The load to be positioned is coupled to shaft 47 by gear box 45. Basically, an input motion of shaft 46 will produce a fine motion of the shaft 47 while the same input motion of shaft 47 will produce a coarse motion of the mechanism without affecting shaft 46.

Mechanism 45 illustrates that shaft 46 is coupled to shaft 47 by some means such as a gear train wherein motion of 46 will move shaft 47 slowly. Shaft 47 is coupled directly to the counter input motion shaft 20′ and shaft 46 is coupled directly to the fine motion counter input 48. Shaft 48 carries and turns with it dial 49 of the fine frequency presentation. Transfer pinion 17 couples dial 49 to dial 50 in a counting operation. Also connected to dial 50 is a gear 51. Dial 50 and its two associated gears are mounted on input shaft 48 but are free to move thereon.

Meshed with gear 51 is a sector gear 52. Sector gear 52 is mounted on correction feed-over coupling shaft 53 and turns said shaft. Correction coupling shaft 53 is rotatably mounted in a portion of the frame 14. Mounted on shaft 53 adjacent the extension 42 of the correction bracket is a coupling dog 54 having an extension 55 which extends axially. Extension 55 engages coupling slot 43. This completes the correction feed-over coupling between the fine frequency dials and the coarse frequency dials.

In operation, motion of the coarse tuning 47 turns gears 22 and 23. This input motion drives the gear train associated with the input shaft. Also, gear 22 drives the first of the coarse frequency dials through idler 37 mounted on the correction shaft 36. As the motion of the input shaft 47 progresses, so is the motion of the dial continued in a direct indication thereof.

The gear-down through the gears on the input and counter shafts, as is apparent, reduces the speed of the input motion, and through the respective idlers on the correction shaft sets in different speeds into the different dials. Congruent to the various motions needed to tune the equipment coupled to shaft 47, the numerals on the dials are related to the frequencies to which the radio equipment is tuned.

The fine motion shaft 46 actuates the fine frequency dials 49 and 50. The input motion of shaft 46, however, is coupled to the coarse tuning shaft 47 by the mechanism 45, and so causes a motion thereof. As the full range of the fine frequency presentation is scanned, the numerals on the coarse frequency dial would start to lose alignment with their index but for the presence of the correction system.

The correction system takes a motion by gear 51 coupled through sector gear 52 and coupling shaft 53 to move the correction bracket by the coupling at coupling slot 43. As observed earlier in description of the correction bracket, motion of the bracket alone with the input shaft held fixed moves the dials 10. The fine motion coupled through the correction train into the correction bracket is arranged with the proper velocity ratio and phase relative to the motion of the input shaft 47 by actuation of fine motion shaft 46, so that misregistration on the coarse frequency dials 10 is now eliminated by an opposing motion of the correction shaft 36 through the correction coupling.

Observation of the equipment pictured shows that as the fine tuning dial 49 moves over a complete cycle, the coarse dial will begin to misregister with the aperture of the mask used to indicate the frequency thereof. As the transfer pinion 17 actuates the other fine frequency dial 50 in its counting operation, the motion of gear 51 introduces a correction motion which shifts correction shaft 36 a slight amount. The coarse frequency indicia being observed is then shifted back into full view from its slightly off-set position. This achieves the desired result of maintaining the coarse frequency dials in full view for correct indication of the frequency while permitting the fine and coarse motions to be related motions of the same variable (on shaft 47) such as a tuning condenser in the radio equipment.

Figure 2:
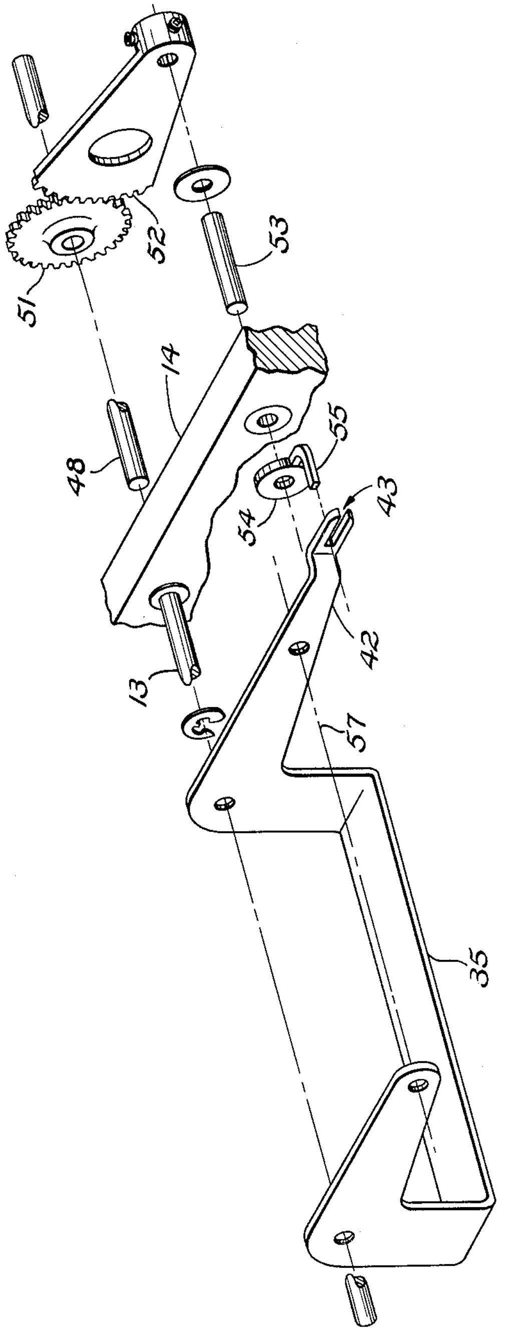
Figure 2 shows an exploded view of the parts in Figure 1 which comprise the correcting system.

Figure 2 shows the components of the correction feed-over system. Fine motion coupling gear 51 is mounted on the fine motion dial system. Sector gear 52 meshes with fine motion gear 51 and drives coupling shaft 53. Coupling shaft 53 is mounted in a portion of the base 14 and has mounted on it coupling dog 54. The extension 55 of coupling dog 54 engages slot 43 of the extension 42 of the correction bracket 35. The axis 57 of correction shaft 36 is shown by a dashed line. The dial shaft 13 is shown as is customary in exploded view, this shaft being mounted in frame 14 also. Correction bracket 35 is mounted on dial shaft 13 and is freely movable thereon.

Although this invention has been described with respect to particular embodiments thereof, it is not to be so limited because changes and modifications may be made therein which are within the full intended scope of the invention as defined by the appended claim.

We claim:

A counter assembly comprising corrector means having first, second and third gears, a frame, said first gear rotatably mounted to said frame and connected to a first input shaft, a coarse tuning counter assembly including at least said third gear and a first counter wheel connected to said third gear rotatably mounted to said frame, said corrector means including bracket means pivotally mounted on said frame, means rotatably mounting said second gear on said bracket means with said second gear in cooperative engagement with said first and third gears, a fine tuning assembly including at least a fourth gear and counter wheel connected to said fourth gear rotatably mounted to said frame, said fine tuning assembly connected to a second input shaft, means connecting said second input shaft to said first input shaft so that said first input shaft partakes of the motion of said second input shaft, a sector gear rotatably mounted on said frame and cooperatively engaged with said fourth gear, and alignment means connected to said sector gear and said bracket means for transferring the movement of said sector gear to said corrector means to thereby prevent misalignment of said coarse tuning counter assembly due to the motion of said second input shaft.

References Cited in the file of this patent

UNITED STATES PATENTS

| | | |
|---|---|---|
| 2,089,682 | Chase | Aug. 10, 1937 |
| 2,271,240 | Avery | Jan. 27, 1942 |